April 19, 1949.  A. M. OLSON  2,467,851
COLLAPSIBLE AUTOMOBILE JACK OF
PIVOTED RACK AND GEAR TYPE
Filed Aug. 8, 1947  2 Sheets-Sheet 1
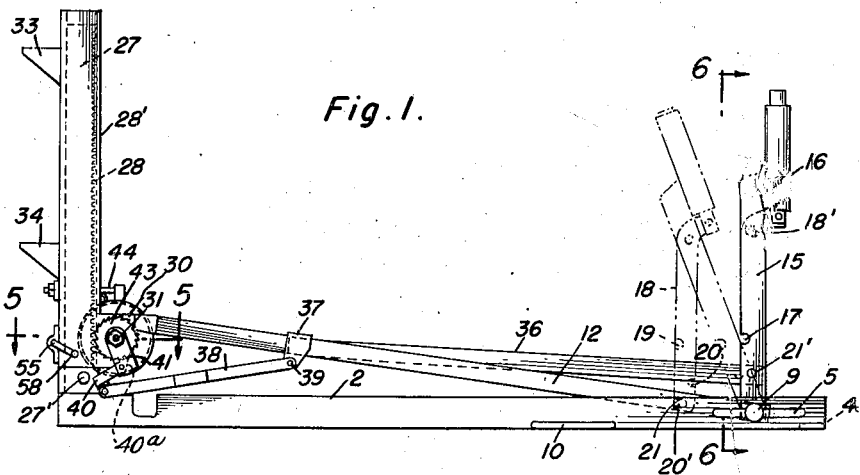
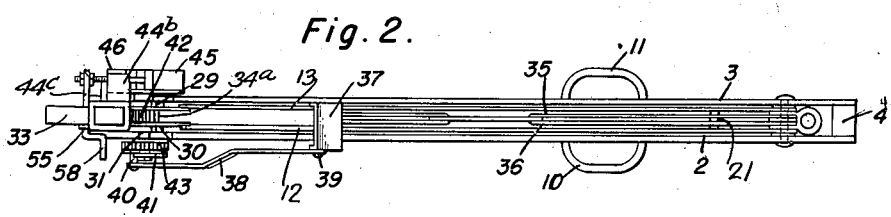
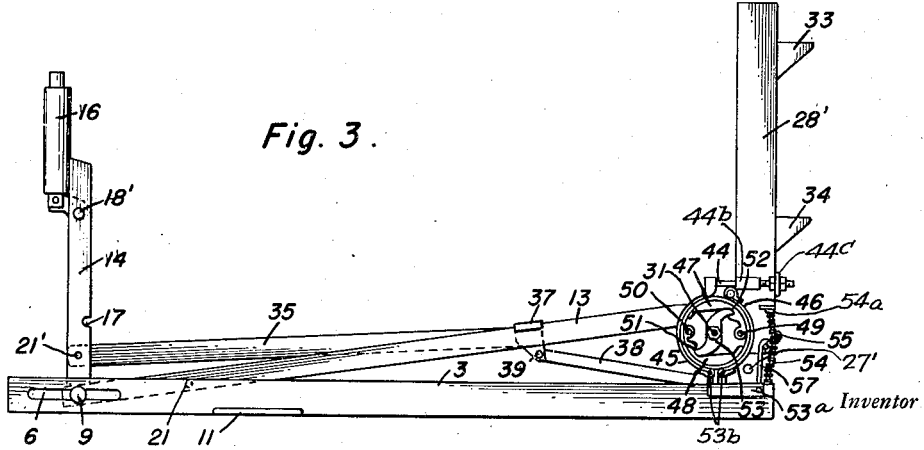
Inventor
Alton M. Olson
By Clarence A. O'Brien
and Harvey B. Jacobson
Attorneys April 19, 1949.                A. M. OLSON                2,467,851
                    COLLAPSIBLE AUTOMOBILE JACK OF
                        PIVOTED RACK AND GEAR TYPE
Filed Aug. 8, 1947                                  2 Sheets-Sheet 2
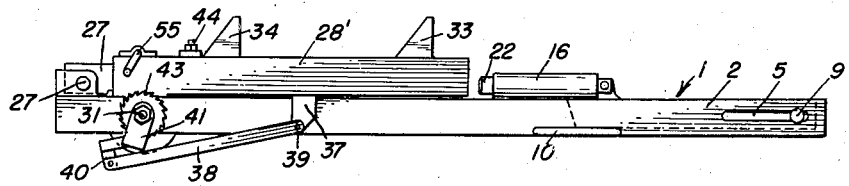
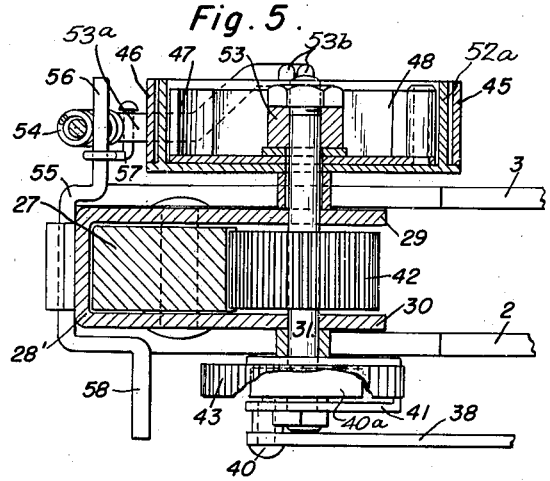
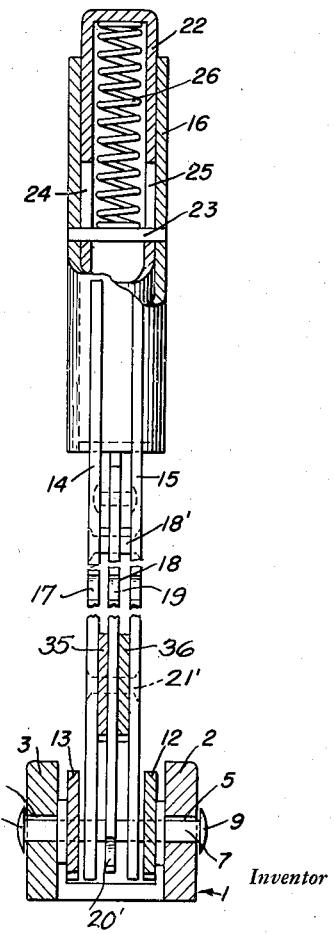
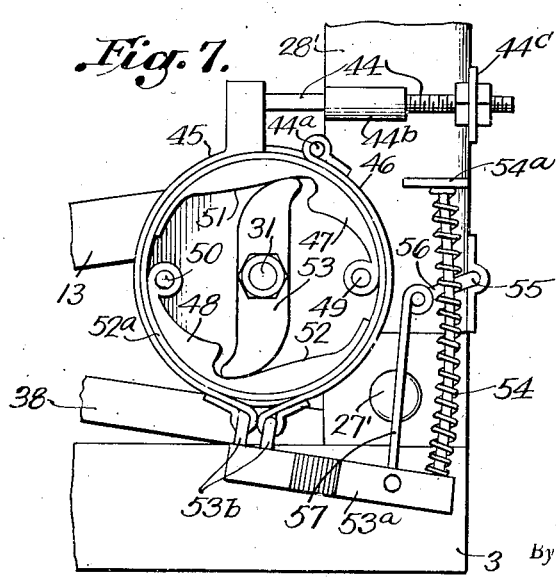
Inventor
Alton M. Olson
By Clarence A. O'Brien
and Harvey B. Jacobson
Attorneys Patented Apr. 19, 1949

2,467,851

UNITED STATES PATENT OFFICE 2,467,851

COLLAPSIBLE AUTOMOBILE JACK OF PIVOTED RACK AND GEAR TYPE

Alton M. Olson, Seattle, Wash.

Application August 8, 1947, Serial No. 767,367

4 Claims. (Cl. 254—95)

This invention relates to improvements in automobile jacks.

An object of the invention is to provide an improved automobile jack which will be foldable when not in use, and which will be readily operable to raise or lower the jack.

Another object of the invention is to provide an improved folding automobile jack construction which will provide variable lengths of throw of the actuating lever for raising and lowering the jack, and manually controlled brake means for use when the jack and its load is being lowered.

A further object of the invention is to provide an improved automobile jack of the alternate ratchet type which will be instantly adjusted until a lifting shoulder is placed in contact with the load to be lifted, after which the jack may be quickly operated to raise the load.

A still further object of the invention is to provide an improved automobile jack which will be positive in action, efficient and relatively inexpensive to manufacture and produce.

Other objects will appear as the description proceeds.

In the accompanying drawings which form a part of this application,

Figure 1 is a side elevation of the improved automobile jack;

Figure 2 is a plan view looking down on the improved automobile jack;

Figure 3 is a side elevation of the reverse side of the automobile jack from the side shown in Figure 1;

Figure 4 is a side elevation of the improved automobile jack shown in folded position;

Figure 5 is an enlarged sectional view taken on the line 5—5 of Figure 1;

Figure 6 is an enlarged sectional view taken on the line 6—6 of Figure 1; and

Figure 7 is an enlarged fragmentary side elevational view of what is hereinafter referred to as the brake mechanism and contiguous parts, a floating brake drum being shown as held against rotation by externally disposed brake bands with the mechanically associated elements in corresponding positions.

Like characters of reference are used throughout the following specification and the accompanying drawings to designate corresponding parts.

In carrying out the invention, there is provided an elongated channel body generally denoted by the reference numeral 1 having opposite sides 2 and 3 and bottom connecting webs 4 at its opposite ends.

An elongated slot 5 is formed through one end of the side 2 and a similarly formed slot 6 is formed in the opposite side 3, and forms a slidable bearing support for the cross extending pivot bolt 7 which is headed at 8 and 9 on its opposite ends.

A pair of oppositely disposed U-shaped handles 10 and 11 are secured to the outer and lower edges of the side 2 and 3, respectively.

A pair of jack actuating bars 12 and 13 are pivotally supported upon the pivot bolt 7 within the lateral limits of the sides 2 and 3.

An actuating hand lever comprises a pair of upwardly extending parallel rods 14 and 15 secured at their upper ends to a handle 16 of tubular construction, while their lower ends are pivotally supported upon the cross pivot bolt 7. Opposed notches 17 are formed in the inner edges of the rods 14 and 15 to receive a cross pin 21, mentioned hereinafter, when the jack is collapsed with the hand lever disposed parallel to the bars 12 and 13.

A rod 18 is disposed centrally of the rods 14 and 15 which are positioned between the actuating bars 12 and 13, being pivoted adjacent its upper end on the cross pin 18', and notches 19 and 20 are formed on upper and lower planes in the inner and outer edges of the rod 18 and a notch 20' is formed in the lower end of the rod 18. The notches 17 and 19 are adapted to engage the cross pin 21 connecting the sides 3 and 2 when the jack is in folded position as illustrated in Figure 4. The notch 20 will engage the cross pin 21' when the handle is in raised position. The upper end of the rod 18 is secured to the inner slidable sleeve 22 disposed within the tubular handle 16. A cross pin 23 is disposed transversely in the handle 16 and also extends through the oppositely disposed slots 24 and 25 in the slidable sleeve 22, while a coil spring 26 is disposed in the outer end of the sleeve 22 for resiliently holding the sleeve 22 in its outermost position. When the jack is to be placed in position to raise a load, the sleeve 22 is pressed downwardly, swinging the rod 18 inwardly to engage the notch 20' with the pin 21, whereupon one motion of the handle 16 will pivot the bars 12 and 13 about the pivot bolt 7 and pre-set the jack to engage the object to be lifted, as will be more clearly understood in the light of the following description.

A rack bar 27 is pivoted on the pivot pin 27' in the opposite or inner end of the jack body 1, and is adapted to extend vertically therefrom, or to fold longitudinally along the top of the jack body 1 when the jack is in folded position. A rack 28 is formed along the inside edge of the rack bar 27 for engagement by a gear 42 on shaft 31, later to be described.

An elongated housing 28', substantially rectangular in shape, is slidably disposed over the rack bar 27, and is formed with the oppositely disposed flanges 29 and 30, best shown in Figure 5 on the lower end. A bolt or shaft 31 is rotatably mounted transversely between the flanges 29 and 30, and a gear 42 is mounted upon the bolt or shaft 31, and is in mesh with the rack 28 upon the rack bar 27.

A pair of vertically spaced load-supporting shoulders 33 and 34 are formed integrally upon the outer edge of the elongated vertically movable housing 28' for disposing under the load (not shown) which is to be lifted. The bars 12 and 13 are pivotally connected to and between the flanges 29 and 30 by a pin 34a.

Connecting rods 35 and 36 are pivoted upon the cross pin 21' and extend toward the housing 28', being connected at their outer ends to a slide 37 disposed on the rods 12 and 13 for reciprocation thereon. A connecting rod 38 is pivoted on the pivot pin 39 on the slide 37, and its opposite end is pivotally attached to a laterally extending arm 40 secured to one end of a dog 40a which is pivoted within a U-shaped bracket 41 and the bracket 41 is pivoted on the shaft 31. The bracket 41 also houses a ratchet wheel 43 fixed to said shaft 31 and by pushing back and forth on the operating handle 16, the dog 40a will turn the ratchet wheel 43 intermittently in one direction, and another gear 42 on the shaft 31 will rotate in mesh with the rack 28 to raise the housing 28' to lift the desired load (not shown).

A brake mechanism is supported on housing 28', and includes the split brake bands 45 and 46, and the oppositely disposed brake shoes 47 and 48 which are pivoted on pins 49 and 50 and are formed with cam surfaces 51 and 52, and a diametrically disposed member 53 mounted on the shaft 31 and comprising a pair of oppositely disposed cams adapted to force the brake shoes outwardly when the shaft is turned in one direction. The brake drum 52a is freely rotatably mounted on the shaft 31 as best shown in Figure 5 and it should be noted that this brake drum is prevented from turning by the brake bands 45 and 46 except when the jack is being collapsed. The upper ends of the brake bands are supported on an adjustable pin 44 and on a fixed pin 44a, the pin 44 being mounted in a sleeve bracket 44b and having a threaded terminal portion adjustably secured on an aperture 44c. The lower ends of the split bands 45 and 46 are pivoted on arms 53b carried by and operated by the lever 53a which is biased into brake band tightening position by the coil spring 54 compressed between a fixed bracket 54a and the outer end of the lever 53a.

The above described mechanism is operative in raising the casing 28', since the movement of the handle 16 as to the right in Figure 1 causes the dog 40a to engage and to turn the ratchet wheel 43, shaft 31 and gear 42, raising the casing 28'. When the handle 16 is moved in the opposite direction, the dog 40a releases and the brake mechanism prevents turning of the gear 42.

The means for collapsing the jack will now be described. A crank 55 is mounted on the housing 28' with its end 56 connected to the depending link 57 on the lever 53a while the end 58 of the crank extends from the opposite side of the jack to be engaged by the dog 40a when the handle 16 is moved to its full limit of travel in a direction as to the left in Figure 1. Rotation of the crank 55 causes the link 57 to move the lever 53a so as to release the brake bands 45 and 46 from the floating or rotatable brake drum 52a, which may then rotate with the brake shoes and shaft 31 to release the gear 42 and allow the casing 28' to fall.

From the foregoing description, it will be apparent that there has been devised and provided a highly efficient form of jack which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. An automobile jack comprising a pair of parallel supporting rails, a toothed rack bar pivotally supported at one end thereof, a work lifting housing slidably disposed on said rack bar, a hand operating lever pivotally supported at the opposite end of said supporting rails, parallel jack-actuating bars pivotally connected between said operating lever and said work-lifting housing, a slide mounted on said actuating bars, a connecting rod connected between said operating lever and said slide, a gear engageable with said toothed rack bar, and operating means therefore connected with said slide.

2. An automobile jack comprising a pair of parallel supporting rails, a toothed rack bar pivotally supported at one end thereof, a work lifting housing slidably disposed on said rack bar, a hand operating lever pivotally supported at the opposite end of said supporting rails, parallel jack-actuating bars pivotally connected between said operating lever and said work-lifting housing, a slide mounted on said actuating bars, a connecting rod connected between said operating lever and said slide, a gear engageable with said toothed rack bar, operating means therefor connected with said slide, and a brake mechanism operatively associated with said gear for holding said jack in adjusted position.

3. An automobile jack comprising a pair of parallel supporting rails, a toothed rack bar pivotally supported at one end thereof, a work lifting housing slidably disposed on said rack bar, a hand operating lever pivotally supported at the opposite end of said supporting rails, parallel jack-actuating bars pivotally connected between said operating lever and said work-lifting housing, a slide mounted on said actuating bars, a connecting rod connected between said operating lever and said slide, a shaft rotatably mounted on said housing, a gear rigidly secured on said shaft and engageable with said toothed rack bar, operating means for the gear connected with said slide, and a brake mechanism comprising a floating brake drum freely rotatably mounted on said shaft, brake bands operatively mounted externally of the brake drum, means for normally biasing said bands into engagement with said drum, means for releasing the brake bands when the handle is in one position, brake shoes within said drum, and cams connected with said shaft to apply said shoes to the drums when the shaft is rotated in one direction.

4. In a jack, a rack bar, a work lifting housing slidably mounted on said rack bar, a shaft rotatably mounted on said housing, a gear rigidly secured on said shaft and engageable with said rack bar, operating means for the gear, and a brake mechanism comprising a floating brake drum freely rotatably mounted on said shaft, brake bands operatively mounted externally of the brake drum, means for normally biasing said bands into engagement with said drum, means for releasing the brake bands when the operating means is in one position, brake shoes within said drum, and cams connected with said shaft to apply said shoes to the drum when the shaft is rotated in one direction.

ALTON M. OLSON.

REFERENCES CITED

The following references are of record in the file of this patent:

UNITED STATES PATENTS

| Number | Name | Date |
|---|---|---|
| 1,627,526 | Nilson | May 3, 1927 |